US010885750B2

(12) United States Patent
Hwang et al.

(10) Patent No.: US 10,885,750 B2
(45) Date of Patent: Jan. 5, 2021

(54) AUTOMATED TELLER MACHINE HAVING BILL STOPPER

(71) Applicant: HYOSUNG TNS INC., Seoul (KR)

(72) Inventors: Jin Young Hwang, Seoul (KR); Kyoung Soo Kim, Gyeonggi-do (KR); Seok Won Kim, Gyeonggi-do (KR); Seung Soo Lee, Gyeonggi-do (KR)

(73) Assignee: HYOSUNG TNS INC., Seoul (KR)

( * ) Notice: Subject to any disclaimer, the term of this patent is extended or adjusted under 35 U.S.C. 154(b) by 0 days.

(21) Appl. No.: 16/413,787

(22) Filed: May 16, 2019

(65) Prior Publication Data

US 2020/0175824 A1 Jun. 4, 2020

(30) Foreign Application Priority Data

Dec. 4, 2018 (KR) ........................ 10-2018-0154779

(51) Int. Cl.

*G06Q 40/00* (2012.01)
*G07D 11/00* (2019.01)
*G07F 19/00* (2006.01)

(52) U.S. Cl.

CPC .......... *G07F 19/202* (2013.01); *G07F 19/203* (2013.01)

(58) Field of Classification Search

USPC .......................................................... 235/379
See application file for complete search history.

(56) References Cited

U.S. PATENT DOCUMENTS

2002/0003163 A1* 1/2002 Peebles .................. G07D 11/14 235/379
2003/0121971 A1* 7/2003 Lee .................... G06Q 20/1085 235/379
2003/0121973 A1* 7/2003 Lee ......................... G07F 19/20 235/381
2005/0258236 A1* 11/2005 Boyes ................... G07F 19/202 235/379
2006/0243789 A1* 11/2006 Lee ........................ G07D 11/14 235/379

(Continued)

FOREIGN PATENT DOCUMENTS

EP 2 874 129 A1 5/2015
EP 3 379 504 A1 9/2018
KR 10-2009-0072665 A1 7/2009

OTHER PUBLICATIONS

Korean Office Action dated Mar. 13, 2020 issued in corresponding Korean Patent Application No. 10-2018-0154779.

(Continued)

*Primary Examiner* — Tuyen K Vo

(74) *Attorney, Agent, or Firm* — Bacon & Thomas, PLLC

(57) ABSTRACT

An automated teller machine comprises a main body; a deposit/withdrawal unit provided at one side in the main body and configured to separate and stack a medium; a customer service unit provided at a front side of the main body and configured to receive a medium from a user; and a tray unit configured to transfer a medium between the deposit/withdrawal unit and the customer service unit while reciprocating therebetween. The deposit/withdrawal unit includes a bill stopper that is rotatably provided to open and close an opening of the deposit/withdrawal unit through which the tray unit passes; and a link unit configured to open and close the bill stopper by providing a rotational force to the bill stopper.

6 Claims, 6 Drawing Sheets

(56) References Cited

U.S. PATENT DOCUMENTS

| | | | | |
|---|---|---|---|---|
| 2007/0000993 A1* | 1/2007 | Graef | B65H 29/40 235/379 |
| 2012/0193190 A1* | 8/2012 | Yokote | G07D 11/14 198/418 |

OTHER PUBLICATIONS

Extended European Search Report dated Apr. 17, 2020 issued in corresponding European Patent Application No. 19209680.8.

* cited by examiner

AUTOMATED TELLER MACHINE HAVING BILL STOPPER

CROSS-REFERENCE TO RELATED APPLICATION

This application is based on and claims priority from Korean Patent Application No. 10-2018-0154779, filed on Dec. 4, 2018, the disclosure of which is incorporated herein in its entirety by reference for all purposes.

FIELD OF THE INVENTION

The present disclosure relates to an automated teller machine having a bill stopper.

BACKGROUND OF THE INVENTION

Generally, an automated teller machine (ATM) provides financial services such as deposit and withdrawal of cash and check using a card or a passbook without a bank employee regardless of time and place.

Recently, the ATM is widely used not only in financial institutions such as banks but also in convenience stores, department stores, and public places. The ATM may be classified into a withdrawal machine, a deposit machine, and a deposit and withdrawal machine depending on whether a transaction is a deposit or a withdrawal. Recently, the ATM is variously used for cash deposit/withdrawal, check deposit/withdrawal, passbook update, electronic bill payment, ticket sales, and the like.

A conventional ATM can be classified into two types depending on an insertion type of a medium such as cash or check. One is a pocket type in which a deposit/withdrawal unit has a pocket shape and allows a user to insert a medium into a pocket. The other one is a present type in which a bill is inserted or withdrawn through a slot formed at the deposit/withdrawal unit. In the case of the pocket type, a user needs to insert a hand into the pocket to insert a medium for deposit. However, depending on a user's culture, a user often minds putting a part of a body into a machine. Therefore, the present type in which a user can deposit/withdraw a medium without inserting a hand into the deposit/withdrawal unit can be applied as a solution to the problem of the pocket type. However, the present type is disadvantageous in that it is weak in security and the number of media that can be deposited/withdrawn at one time is limited. Thus, a user who wants to deposit/withdraw a large amount of media at one time feels uncomfortable.

Although there have been attempts to combine the pocket type and the present type to solve the problems of the two types, it is still far from practical application due to a complicated structure and lack of practicality. Therefore, there is a demand for research on a deposit/withdrawal unit having an innovative structure capable of solving the problems of the pocket type and the present type.

Patent Document: Korean Patent Application Publication No. 10-2014-0077439

SUMMARY OF THE INVENTION

In view of the above, the present disclosure provides an automated teller machine (ATM) having a bill stopper which provides a simple deposit/withdrawal unit and solves the problems of the pocket type and the present type.

In accordance with an aspect, there is provided an automated teller machine comprising: a main body; a deposit/withdrawal unit provided at one side in the main body and configured to separate and stack a medium; a customer service unit provided at a front side of the main body and configured to receive a medium from a user; and a tray unit configured to transfer a medium between the deposit/withdrawal unit and the customer service unit while reciprocating therebetween, wherein the deposit/withdrawal unit includes: a bill stopper that is rotatably provided to open and close an opening of the deposit/withdrawal unit through which the tray unit passes; and a link unit configured to open and close the bill stopper by providing a rotational force to the bill stopper.

The link unit may include: a rotatable driving wheel; a fixed frame having one end fixedly coupled to one end of the bill stopper and rotating together with the bill stopper; and a movable link having opposite ends, one end being hinge-coupled to the other end of the fixed frame and the other end being hinge-coupled to a circumference of the driving wheel.

In the link unit, when the opening of the deposit/withdrawal unit is completely opened by the rotation of the bill stopper, the opposite ends of the movable link and a center of rotation of the driving wheel may be positioned on a straight line.

In the link unit, when the opening of the deposit/withdrawal unit is completely closed by the rotation of the bill stopper, the opposite ends of the movable link and the center of rotation of the driving wheel may be positioned on a straight line.

The fixed frame and the bill stopper may be coupled such that an acute angle is formed therebetween.

The link unit may further include: a relay gear engaged with the driving wheel to transfer a rotational force to the driving wheel; a driver gear engaged with the relay gear to transfer a rotational force to the relay gear; and a driving unit configured to generate a rotational force and provide the rotational force to the driver gear.

The relay gear may include: a first gear and a second gear having different diameters and formed as one unit on the same center of rotation, wherein the first gear has a diameter greater than a diameter of the driver gear and is engaged with the driver gear, and the second gear has a diameter smaller than diameters of the first gear and the driving wheel and is engaged with the driving wheel.

The bill stopper may be rotated between a closed position in which the opening of the deposit/withdrawal unit is closed and a medium inserted into the tray unit collides with the bill stopper and an open position in which the opening of the deposit/withdrawal unit is opened so that the tray unit retreats.

Effect of the Invention

In accordance with the embodiment of the present disclosure, it is possible to solve the problem of the conventional pocket type in which a part of a user's body needs to be inserted into the device and the problem of the present type in which the security is weak and the amount of media that can be deposited/withdrawn at one time is limited. In addition, a bill stopper can be easily opened and closed by a simple link structure without being unintentionally opened or closed using no additional locking unit.

BRIEF DESCRIPTION OF THE DRAWINGS

The objects and features of the present disclosure will become apparent from the following description of embodiments, given in conjunction with the accompanying drawings, in which.

DETAILED DESCRIPTION OF THE EMBODIMENTS

Figure 1:
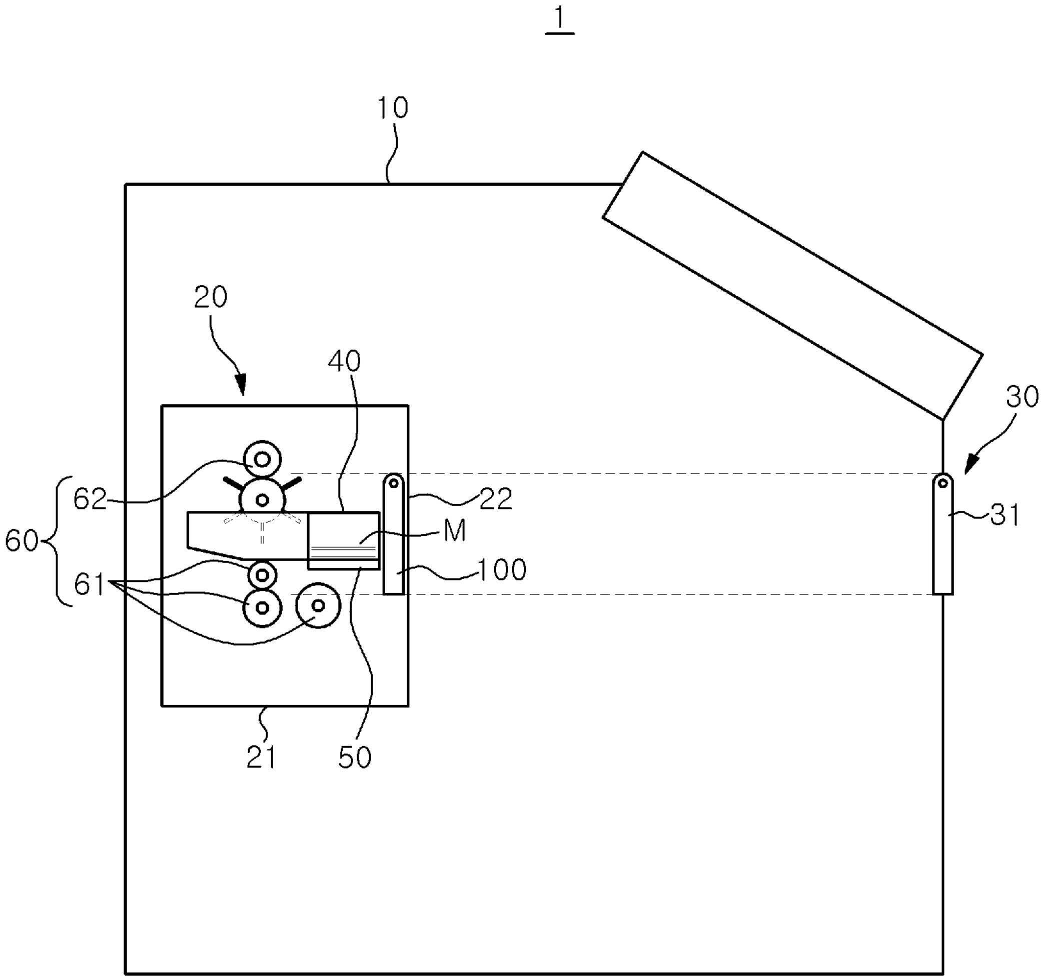
FIG. 1 is a conceptual diagram of an automated teller machine (ATM) according to an embodiment of the present disclosure.

Hereinafter, configurations and operations of embodiments will be described in detail with reference to the accompanying drawings. The following description is one of various patentable aspects of the disclosure and may form a part of the detailed description of the disclosure.

In describing the embodiments of the present disclosure, the detailed descriptions of well-known functions or configurations will be omitted if it is determined that the detailed descriptions of well-known functions or configurations may unnecessarily make obscure the spirit of the present disclosure.

The disclosure may be variously modified and may include various embodiments. Specific embodiments will be exemplarily illustrated in the drawings and described in the detailed description of the embodiments. However, it should be understood that they are not intended to limit the disclosure to specific embodiments but rather to cover all modifications, similarities, and alternatives which are included in the spirit and scope of the disclosure.

The terms used herein, including ordinal numbers such as "first" and "second" may be used to describe, and not to limit, various components. The terms simply distinguish the components from one another.

When it is said that a component is "coupled" or "linked" to another component, it should be understood that the former component may be directly connected or linked to the latter component or a third component may be interposed between the two components.

Specific terms used in the present application are used simply to describe specific embodiments without limiting the disclosure. An expression used in the singular encompasses the expression of the plural, unless it has a clearly different meaning in the context.

Hereinafter, an embodiment of the present disclosure will be described in detail with reference to the accompanying drawings.

Figure 2:
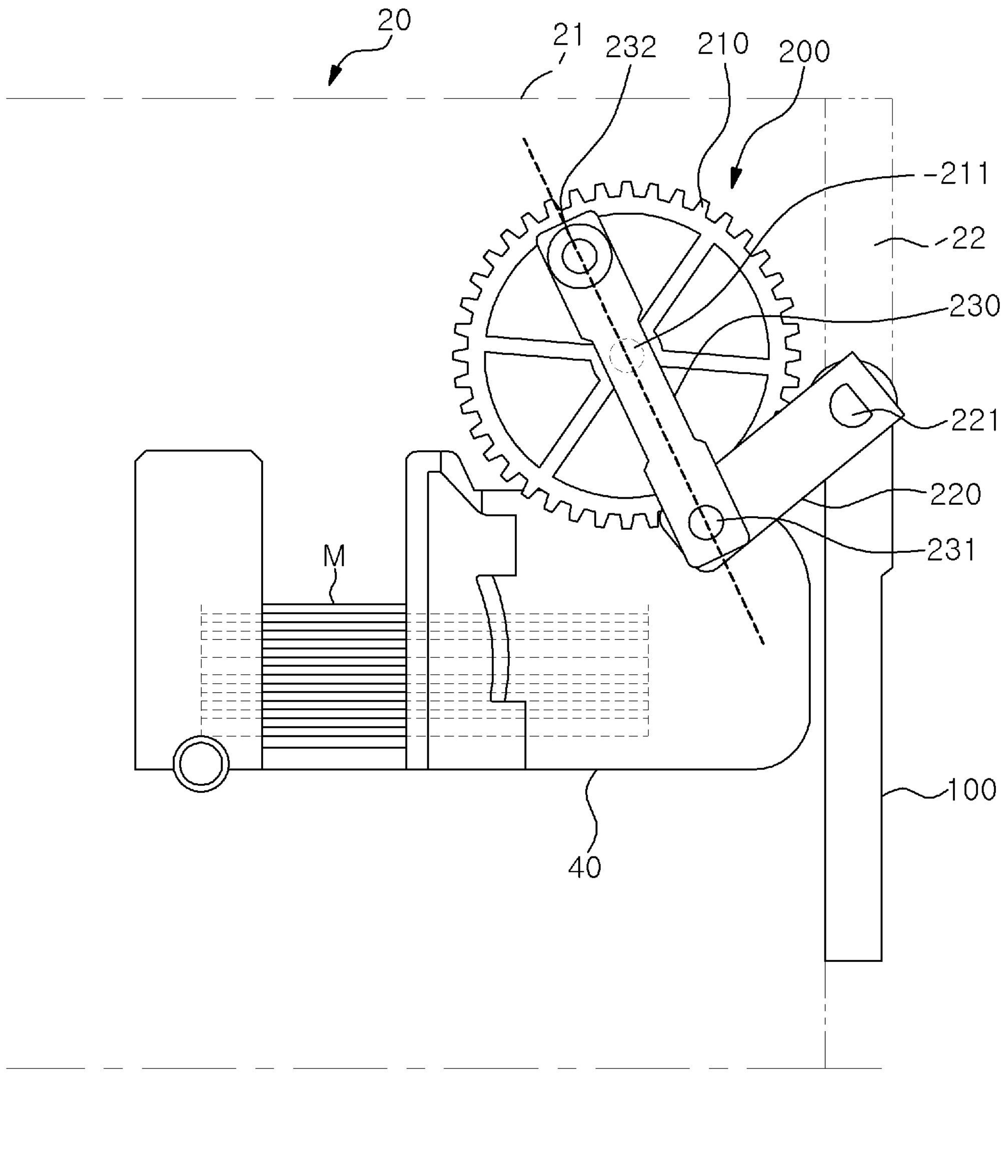
FIG. 2 shows a part of a configuration of a bill stopper and a link unit of the ATM according to the embodiment of the present disclosure.

Referring to FIGS. 1 and 2, an automated teller machine (ATM) 1 having a bill stopper according to an embodiment of the present disclosure may include a main body 10, a deposit/withdrawal unit 20, a customer service unit 30, and a tray unit 40.

The main body 10 forms an outer shape of the ATM 1, and can accommodate therein a lifting module 50 and the tray unit 40.

The deposit/withdrawal unit 20 is provided at one side in the main body 10, and can separate and stack media to be deposited/withdrawn. Therefore, the deposit/withdrawal unit 20 may include a housing 21, a separating/stacking module 60, and the lifting module 50.

The housing 21 may be provided in the main body 10 and accommodate the components of the deposit/withdrawal unit 20. Further, the housing 21 may be provided with a tray opening 22 through which the tray unit 40 to be described later can pass. The separating/stacking module 60 may be disposed in the housing 21.

The separating/stacking module 60 may include a separating roller 61 and a stacking roller 62. The separating roller 61 may be provided to separate media M transferred by the tray unit 40, and may be disposed at a lower side in the housing 21.

The separating roller 61 may separate the media M stored in the tray unit 40 one by one and transfer the media along a transfer path. The stacking roller 62 may be provided to stack a rejected medium M or a medium M to be withdrawn among the media separated by the separating roller in the tray unit 40. The tacking roller 62 may be disposed at an upper side in the housing 21.

The lifting module 50 is provided in the housing 21 to selectively move the tray unit 40 in a vertical direction. Due to the vertical movement, the media stacked in the tray unit 40 can be transferred along the transfer path in the main body 10, or the media in the main body 10 can be transferred to a position where the media can be stacked in the tray unit 40. In other words, when the tray unit 40 is lowered by the lifting module 50, the tray unit 40 is overlapped with the separating roller 61 and the media stacked in the tray unit 40 can be separated and stored along the transfer path in the main body 10 by the operation of the separating roller 61. At this time, the state in which the tray unit 40 is lowered and overlapped with the separating roller 61 can be referred to as "separation mode."

On the other hand, when the tray unit 40 is lifted by the lifting module 50, the media can be inserted into and stacked in the tray unit 40 by the operation of the stacking roller 62. In that case, the medium can be stacked in the tray unit by the stacking roller 62 in order to transfer a rejected medium among the media separated by the separating roller 61 or withdraw a medium stored in a cassette (not shown) in the main body 10. The state in which the tray unit 40 is lifted and the medium is inserted into the tray unit 40 by the stacking roller 62 can be referred to as "stacking mode."

The customer service unit 30 may be provided to insert or receive media such as banknotes or checks, and may be provided at a front side of the main body 10 to facilitate deposit or withdrawal. The customer service unit 30 may be provided with a deposit/withdrawal shutter 31 so that the medium can be inserted into or discharged from the ATM 1. The deposit/withdrawal shutter 31 can be opened and closed by an additional control signal.

The tray unit 40 reciprocates from the customer service unit 30 to the inside of the deposit/withdrawal unit to transfer the media stored therein to the deposit/withdrawal unit 20 or the customer service unit 30. In other words, the tray unit 40 can receive a medium from a customer at the customer service unit 30 and move to the deposit/withdrawal unit 20 to separate and store the media. Further, the tray unit 40 can receive a withdrawal target media from the deposit/withdrawal unit 20 and move to the customer service unit 30 to deliver the media to a customer.

Thus, the tray unit 40 can be inserted into or taken out from the housing 21 through the opening 22 of the deposit/withdrawal unit 20. The tray unit 40 inserted into the housing 21 can be mounted on the lifting module 50.

The deposit/withdrawal unit 20 may include a bill stopper 100 and a link unit 200 to open and close the opening 22 of the deposit/withdrawal unit 20 during the movement of the tray unit 40.

As shown in FIG. 2, the bill stopper 100 is rotatably provided at the housing 21 of the deposit/withdrawal unit 20, and can open and close the opening 22 of the deposit/withdrawal unit 20, if necessary. In other words, the bill stopper 100 is opened when the tray unit 40 is taken out from the deposit/withdrawal unit 20, and closed when the tray unit 40 has been inserted into the deposit/withdrawal unit 20. Accordingly, the medium inserted into the tray unit 40 and stacked by the operation of the stacking roller 62 collides with an inner surface of the closed bill stopper 100 and then can be stacked in the tray unit 40.

Specifically, the bill stopper 100 can rotate between a closed position in which the opening 22 of the deposit/withdrawal unit 20 is closed (see, e.g., FIG. 2) and the medium inserted into the tray unit 40 collides with the bill stopper 100 in the stacking mode and an open position (see, e.g., FIG. 4) in which the opening 22 of the deposit/withdrawal unit 20 is opened so that the tray unit can retreat toward the customer service unit 30 on a reciprocation path.

The link unit 200 can provide a rotational force to the bill stopper 100 to open and close the bill stopper 100. The link unit 200 provides the rotational force to the center of rotation of the bill stopper 100 to open the bill stopper 100 when it is necessary to take out the tray unit 40 from the deposit/withdrawal part 20 and to close the bill stopper 100 when the tray unit 40 has been inserted into the deposit/withdrawal unit 20, thereby helping a medium stacking function.

Referring to FIG. 2, the link unit 200 may include a driving wheel 210, a fixed frame 220, and a movable link 230.

Specifically, the driving wheel 210 can be rotatably provided at the housing 21 to open and close the bill stopper 100. The driving wheel 210 may be configured as a gear having a predetermined diameter, and can be driven by an external force from another configuration.

The fixed frame 220 may be integrally coupled to the bill stopper 100 and move together with the bill stopper 100. One end of the fixed frame 220 is fixedly coupled to the center of rotation of the bill stopper 100, and the fixed frame 220 is rotatable about the center of rotation.

At this time, the fixed frame 220 and the bill stopper 100 are coupled so that an acute angle is formed therebetween. The angle between the fixed frame 220 and the bill stopper 100 is constant without being changed by the movement of the fixed frame 220 and the bill stopper 100.

Here, a connection member 221 may be provided at the center of rotation of the fixed frame 220 and the bill stopper 100. The connection member 221 has a cross section in which a part of a circumference of a circle is cut to be flat. Therefore, the rotational force is transferred from the fixed frame 220 to the bill stopper 100 without slip due to the flat surface. Accordingly, the bill stopper 100 can rotate at the same angle as the rotation angle of the fixed frame 220.

The movable link 230 is configured to transfer the rotational force of the driving wheel 210 to the fixed frame 220 to open and close the bill stopper 100. One end of the movable link 230 is hinge-coupled to the other end of the fixed frame 220 through a first hinge portion 231.

The other end of the movable link 230 is hinge-coupled to the driving wheel 210 through a second hinge portion 232. The second hinge portion 232 can be hinge-coupled to any one point on the circumference of the driving wheel 210 to transfer the rotational force of the driving wheel 210 to the movable link 230 linearly.

Figure 3:
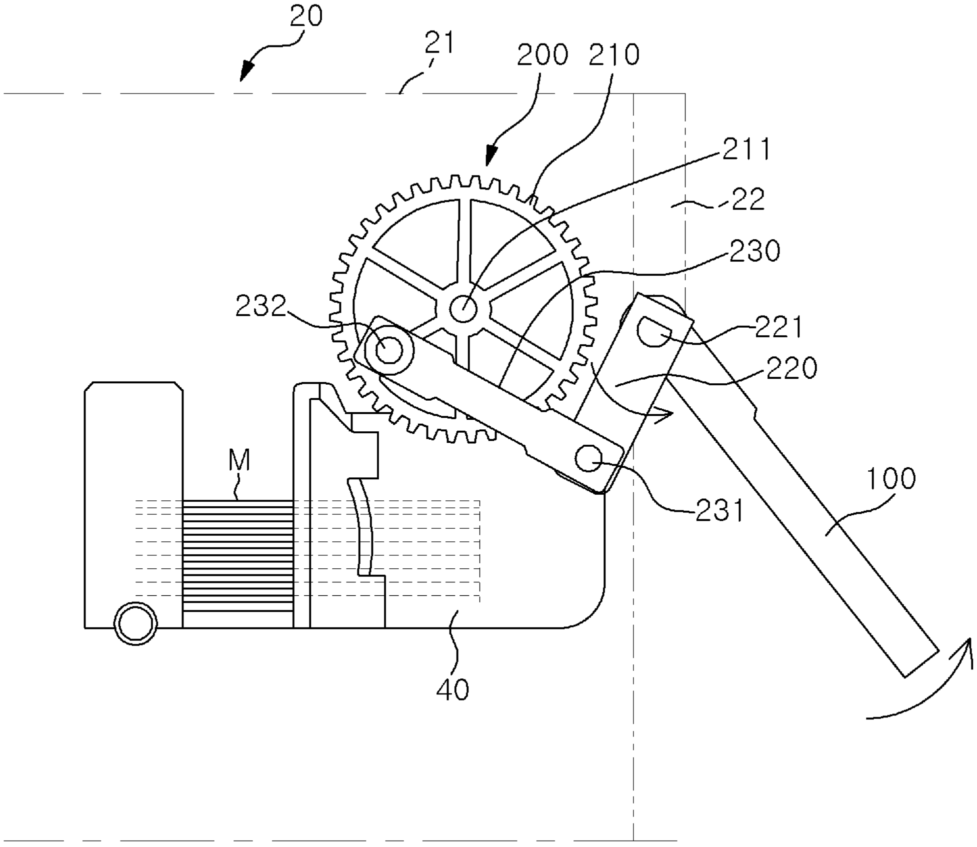
FIGS. 3 and 4 show operation states of the bill stopper and the link unit of the ATM according to the embodiment of the present disclosure.
Figure 4:
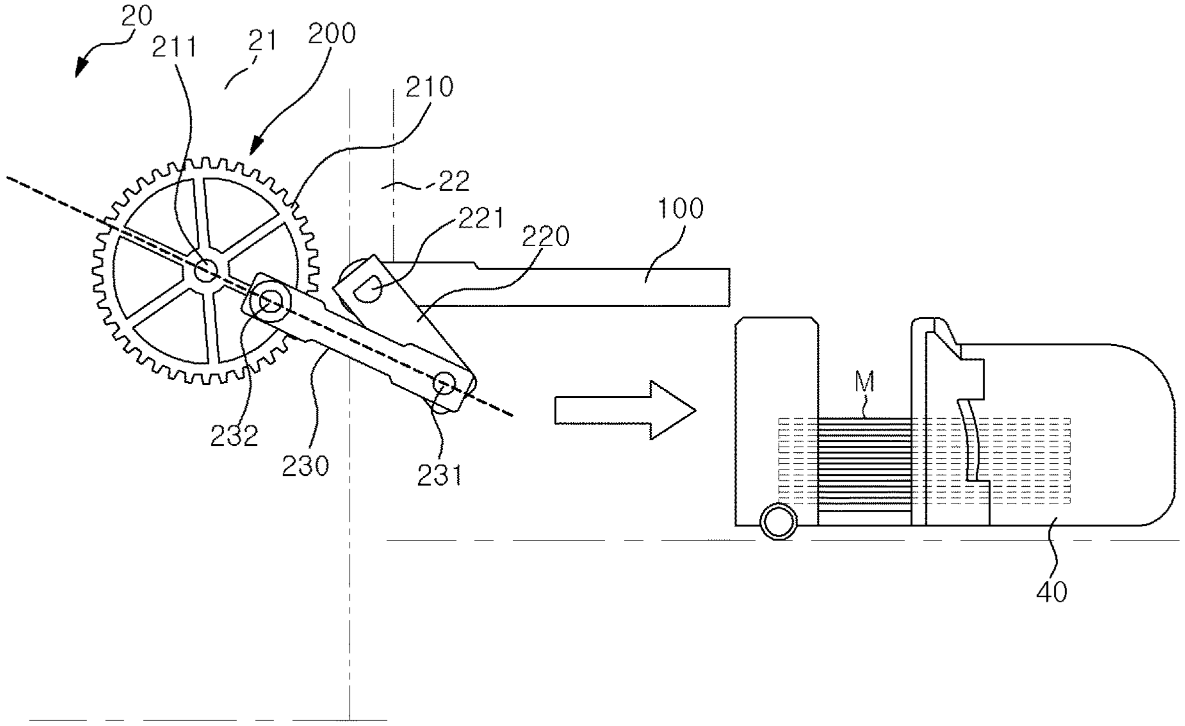

Therefore, as shown in FIGS. 3 and 4, when the driving wheel 210 rotates, the rotational force of the driving wheel 210 is transferred to the movable link 230 through the second hinge portion 232. Accordingly, the movable link 230 moves linearly, and the linear movement of the movable link 230 can be transferred to the fixed frame 220 through the first hinge portion 231. When receiving an external force from the movable link 230, the fixed frame 220 rotates about the connection member 221 provided at the center of rotation of the bill stopper 100, thereby rotating the bill stopper 100 at the same angle as the angle of rotation of the fixed frame 220 and opening the bill stopper 100 as shown in FIG. 4. As shown in FIG. 4, when the bill stopper 100 is opened, the tray unit 40 can be taken out from the deposit/withdrawal unit 20 and moved toward the customer service unit 30.

As shown in FIGS. 2 and 4, the link unit 200 may be configured such that the first hinge portion 231, the second hinge portion 232, and the center of rotation 211 of the driving wheel 210 can be positioned on a straight line when the bill stopper 100 is completely closed (see FIG. 2) or completely opened (see FIG. 4). This is to prevent the bill stopper 100 from being opened and closed by any external force applied to the bill stopper 100.

In other words, the bill stopper 100 should be opened and closed only by the rotation of the driving wheel 210. When the first hinge portion 231, the second hinge portion 232, and the center of rotation 211 of the driving wheel 210 are positioned on a straight line in a state where the bill stopper 100 is completely closed as shown in FIG. 2 or completely opened as shown in FIG. 4, an external force applied to the bill stopper 100 does not act as a force for rotating the driving wheel 210 and acts as a force for pulling or pushing the driving wheel 210 in a normal direction of the driving wheel 210 through the movable link 230. Therefore, the rotation of the driving wheel 210 can be prevented.

For example, as shown in FIG. 2, if the medium is stacked in the tray unit 40 in a state where the bill stopper 100 is closed, the medium collides with the bill stopper 100. The impact energy due to the collision with the bill stopper 100 generates a moment in a direction in which the building stopper 100 is opened, and the moment acts as a force for pulling the driving wheel 210 through the movable link 230. Since, however, the first hinge portion 231 is positioned on a straight line together with the center of rotation 211 of the driving wheel 210 and the second hinge portion 232, the first hinge portion 231 pulls the driving wheel 210 in a normal direction of the driving wheel 210 without rotating the driving wheel 210. Accordingly, the bill stopper 100 is not opened.

Further, as shown in FIG. 4, in a state where the bill stopper 100 is opened, a moment is generated in a direction in which the bill stopper 100 is closed by the weight of the bill stopper 100, and acts as a force for pushing the driving wheel 210 through the movable link 230. Since, however, the second hinge portion 232, the first hinge portion 231, and the center of rotation of the driving wheel 210 are positioned on a straight line, the first hinge portion 231 pushes the driving wheel 210 in a normal direction of the driving wheel 210 without rotating the driving wheel 210. Accordingly, the bill stopper 100 is not closed.

Figure 5:
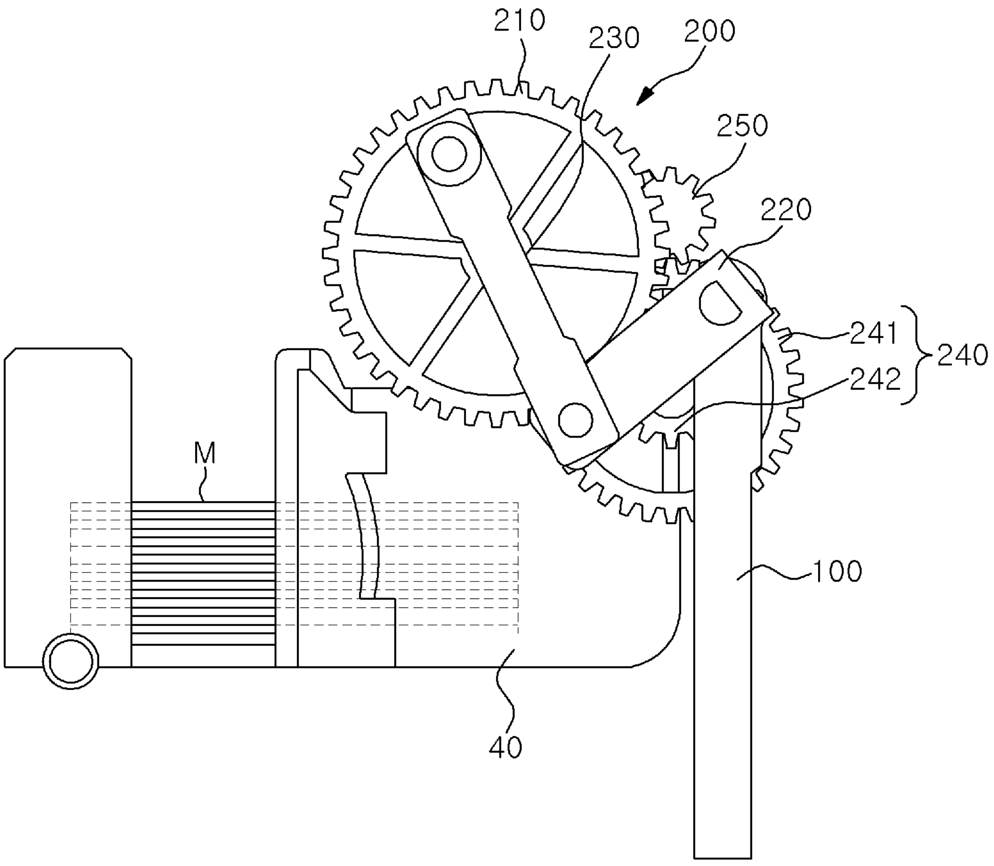
FIG. 5 shows a detailed configuration of the link unit of the ATM according to the embodiment of the present disclosure.
Figure 6:
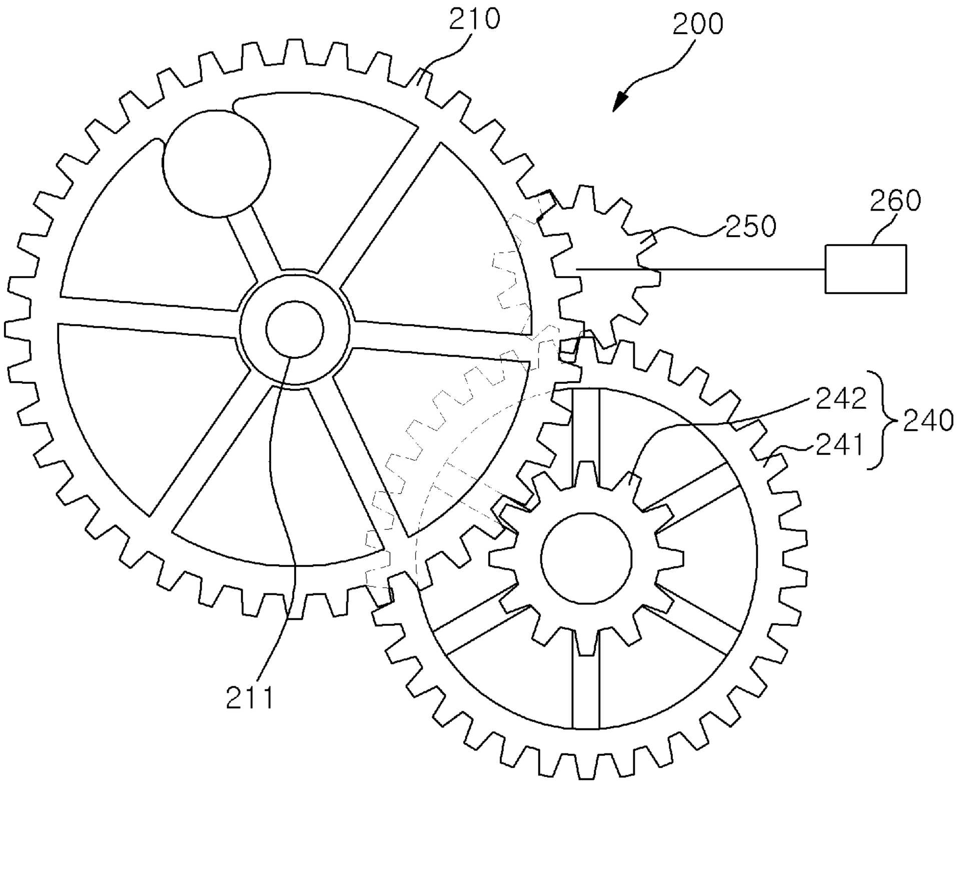
FIG. 6 is a reference diagram for explaining gear connection relationship between gears of the link unit shown in FIG. 5.

Referring to FIGS. 5 and 6, the link unit 200 may further include a relay gear 240, a driver gear 250, and a driving unit 260 to rotate the driving wheel 210.

The relay gear 240 is engaged with the driving wheel 210 and transfers a rotational force to the driving wheel 210. The driver gear 250 can be geared to the relay gear 240 and transfer a rotational force to the relay gear 240.

The driving unit 260 can generate a rotational force and provide the rotational force to the driver gear 250. The driving unit 260 can be implemented as a bi-directional motor capable of rotating bi-directionally. Therefore, when the driving unit 260 operates, the driver gear 250 rotates. The rotational force of the the driver gear 250 can be transferred to the driving wheel 210 through the relay gear 240. Accordingly, the bill stopper 100 can be opened and closed.

At this time, the relay gear 240 may have a reduction gear structure to rotate the driving wheel 210 with a small force from the driver gear 250. Therefore, the relay gear 240 may be configured as a double gear structure including a first gear 241 and a second gear 242 having different diameters and formed as one unit on the same central axis of rotation.

Here, the first gear 241 has a diameter greater than that of the driver gear 250 for a gear reduction and is engaged with the driver gear 250. The second gear 242 has a diameter smaller than that of the first gear 241 and is geared to the driving wheel 210.

While the present disclosure has been shown and described with respect to the embodiments, it will be understood by those skilled in the art that various changes and modifications may be made without departing from the scope of the present disclosure as defined in the following claims.

What is claimed is:

1. An automated teller machine, comprising:

a main body;

a deposit/withdrawal unit provided at one side in the main body and configured to separate and stack a medium;

a customer service unit provided at a front side of the main body and configured to receive a medium from a user; and a tray unit configured to transfer a medium between the deposit/withdrawal unit and the customer service unit while reciprocating therebetween, wherein the deposit/withdrawal unit includes:

a bill stopper that is rotatably provided to open and close an opening of the deposit/withdrawal unit through which the tray unit passes; and a link unit configured to open and close the bill stopper by providing a rotational force to the bill stopper;

wherein the link unit includes:

a rotatable driving wheel;

a fixed frame having one end fixedly coupled to one end of the bill stopper and rotating together with the bill stopper; and a movable link having opposite ends, one end being hinge-coupled to the other end of the fixed frame and the other end being hinge-coupled to a circumference of the driving wheel, and wherein, in the link unit, when the opening of the deposit/withdrawal unit is completely opened by the rotation of the bill stopper, the opposite ends of the movable link and a center of rotation of the driving wheel are positioned on a straight line.

2. The automated teller machine of claim 1, wherein in the link unit, when the opening of the deposit/withdrawal unit is completely closed by the rotation of the bill stopper, the opposite ends of the movable link and the center of rotation of the driving wheel are positioned on the straight line.

3. The automated teller machine of claim 1, wherein the fixed frame and the bill stopper are coupled such that an acute angle is formed therebetween.

4. The automated teller machine of claim 1, wherein the link unit further includes:

a relay gear engaged with the driving wheel to transfer the rotational force to the driving wheel;

a driver gear engaged with the relay gear to transfer the rotational force to the relay gear; and a driving unit configured to generate the rotational force and provide the rotational force to the driver gear.

5. The automated teller machine of claim 4, wherein the relay gear includes:

a first gear and a second gear having different diameters and formed as one unit on the same center of rotation, wherein the first gear has a diameter greater than a diameter of the driver gear and is engaged with the driver gear, and the second gear has a diameter smaller than diameters of the first gear and the driving wheel and is engaged with the driving wheel.

6. The automated teller machine of claim 1, wherein the bill stopper is rotated between a closed position in which the opening of the deposit/withdrawal unit is closed and a medium inserted into the tray unit collides with the bill stopper and an open position in which the opening of the deposit/withdrawal unit is opened so that the tray unit retreats.

* * * * *